United States Patent
Stoffel

(10) Patent No.: US 9,156,184 B2
(45) Date of Patent: Oct. 13, 2015

(54) ALIGNMENT DEVICE AND METHOD FOR ALIGNING GUIDE RAILS FOR A WOODWORKING TOOL

(71) Applicant: Thomas Stoffel, Andover, MN (US)

(72) Inventor: Thomas Stoffel, Andover, MN (US)

( * ) Notice: Subject to any disclaimer, the term of this patent is extended or adjusted under 35 U.S.C. 154(b) by 276 days.

(21) Appl. No.: 13/849,805

(22) Filed: Mar. 25, 2013

(65) Prior Publication Data

US 2013/0247738 A1    Sep. 26, 2013

Related U.S. Application Data

(60) Provisional application No. 61/615,470, filed on Mar. 26, 2012.

(51) Int. Cl.
| | |
|---|---|
| B26D 5/00 | (2006.01) |
| B27B 11/02 | (2006.01) |
| B27B 3/28 | (2006.01) |
| B27B 5/18 | (2006.01) |
| F16D 1/00 | (2006.01) |
| F16B 21/00 | (2006.01) |
| B27G 23/00 | (2006.01) |
| B26D 7/00 | (2006.01) |
| B23Q 9/00 | (2006.01) |
| B27B 9/04 | (2006.01) |

(52) U.S. Cl.
CPC ............. *B27G 23/00* (2013.01); *B23Q 9/0042* (2013.01); *B26D 7/0006* (2013.01); *B27B 9/04* (2013.01); *Y10T 29/49902* (2015.01); *Y10T 83/8878* (2015.04)

(58) Field of Classification Search
CPC ........ B27G 23/00; B27B 9/04; B23Q 9/0042; B26D 7/0006; Y10T 83/8878; Y10T 29/49902; Y10T 403/4662; Y10T 403/4661; Y10T 403/4665; Y10T 403/4674; Y10T 403/4677
USPC ................ 83/543, 745, 829, 574, 441.1, 821; 403/321, 325, 322.1, 397; 24/613–615, 24/573.09
See application file for complete search history.

(56) References Cited

U.S. PATENT DOCUMENTS

| | | | | |
|---|---|---|---|---|
| 3,586,077 A | * | 6/1971 | Pease ............................. | 30/376 |
| 3,850,482 A | * | 11/1974 | Gutner ........................... | 384/22 |
| 4,155,383 A | * | 5/1979 | Welliver ..................... | 144/154.5 |
| 4,179,066 A | * | 12/1979 | Teter ........................... | 238/10 E |
| 4,231,517 A | * | 11/1980 | Cheng .......................... | 238/10 F |
| 4,244,118 A | * | 1/1981 | Matuszak ...................... | 33/430 |
| 4,356,748 A | * | 11/1982 | Tilton ............................ | 83/745 |
| 4,463,644 A | * | 8/1984 | Ferdinand et al. ............. | 83/745 |

(Continued)

*Primary Examiner* — Ghassem Alie
*Assistant Examiner* — Bharat C Patel
(74) *Attorney, Agent, or Firm* — Alan D. Kamrath; Kamrath IP Lawfirm, P.A.

(57) ABSTRACT

An alignment utensil includes two guide rails (100A, 100B), an alignment device (10) aligning the guide rails (100A, 100B), and connectors (110A, 110B, 120) fixing the aligned guide rails (100A, 100B) together. The alignment device (10) includes a body (12) having a lateral surface (31) extending across abutting ends of the guide rails (100A, 100B). Each of two clamping pads (70) mounted on the body (12) is moved to press against a first lateral wall (108A) of one of the guide rails (100A, 100B) to abut a second lateral wall (108B) of each guide rail (100A, 100B) against the first lateral surface (31), aligning the first lateral walls (108A) of the guide rails (100A, 100B) and aligning the second lateral walls (108B) of the guide rails (100A, 100B). A method of aligning the guide rails (100A, 100B) uses the alignment device (10) and the connectors (110A, 110B, 120).

16 Claims, 5 Drawing Sheets

(56) References Cited

U.S. PATENT DOCUMENTS

| | | | |
|---|---|---|---|
| 5,127,131 A * | 7/1992 | Corrigan et al. | 16/422 |
| 5,171,098 A * | 12/1992 | Jost | 403/252 |
| 5,687,649 A * | 11/1997 | Koeninger et al. | 104/106 |
| 6,074,269 A * | 6/2000 | Rothbarth et al. | 446/268 |
| 6,158,930 A * | 12/2000 | Etter | 409/180 |
| 6,220,317 B1 * | 4/2001 | Martin et al. | 144/372 |
| 6,499,224 B1 * | 12/2002 | Asick | 33/628 |
| 7,083,111 B2 * | 8/2006 | Reisher et al. | 238/10 F |
| 7,610,839 B1 * | 11/2009 | Bessette | 83/743 |
| 7,621,206 B2 * | 11/2009 | Makropoulos | 83/574 |
| 7,802,856 B2 * | 9/2010 | Hashemi et al. | 312/334.46 |
| 7,856,723 B2 * | 12/2010 | Thomas et al. | 30/371 |
| 2003/0233926 A1 * | 12/2003 | Makropoulos | 83/829 |
| 2006/0081099 A1 | 4/2006 | Bradbury | 83/13 |
| 2007/0172311 A1 * | 7/2007 | Sanz Gamboa | 403/252 |
| 2009/0308218 A1 * | 12/2009 | Raff et al. | 83/745 |

* cited by examiner

ALIGNMENT DEVICE AND METHOD FOR ALIGNING GUIDE RAILS FOR A WOODWORKING TOOL

CROSS-REFERENCE TO RELATED APPLICATIONS

This application is related to and claims benefit of U.S. Provisional Application No. 61/615,470 filed Mar. 26, 2012.

BACKGROUND

A woodworking utensil including two guide rails and an alignment device for a woodworking tool are shown. A method using the alignment device to align the guide rails is also disclosed.

Guide rails are used to guide woodworking tools, such as circular saws, routers, jigsaws, and the like, in a straight line, allowing increased accuracy and ease of use of the woodworking tools. The guide rails are generally constructed of aluminum and include a substantially flat bottom surface that rests on the workpiece in use and include one or more tool base guiding tracks on a top surface to engage with one or more channels in a base of the woodworking tool being guided. The tool base guiding tracks have provisions to accept accessories, such as clamps, stops, and connectors. In a case that the workpiece is longer than the length of a single guide rail, two or more guide rails have to be connected end-to-end. Although connectors for securing the guide rails together are available, the connectors can not insure that the guide rails are connected in a straight line. In use, it is difficult to connect guide rails together in a straight line.

Thus, a need exists for a novel alignment device for insuring alignment of two guide rails connected end-to-end and for a novel method for reliably aligning the guide rails.

BRIEF SUMMARY

These needs and other problems in the field of reliable alignment of two guide rails for a woodworking tool are solved by providing, in a first aspect, a woodworking utensil including two guide rails each having a tool base guiding track with first and second lateral walls. The tool base guiding tracks of the first and second guide rails are adapted to be slideably received in a channel of a base of a woodworking tool. An alignment device is provided for aligning the guide rails abutting end-to-end in a straight line. The alignment device includes a body including a first lateral surface extending in a length direction. The body slideably rests on the guide rails abutting end-to-end, with the first lateral surface extending across the abutting ends of the guide rails, and with the second lateral wall of each guide rail located between the first lateral wall of each guide rail and the first lateral surface of the body in a width direction perpendicular to the length direction. The alignment device further includes two clamping pads mounted on the body and spaced from each other in the length direction and on opposite sides of the abutting ends of the guide rails. Each clamping pad is moveable between a clamping position and a non-clamping position, with the clamping position having a spacing to the first lateral surface in the width direction smaller than the non-clamping position. The guide rails in the straight line are fixed together by a plurality of connectors.

In a second aspect, an alignment device for woodworking tool guide rails includes a body having a first lateral surface extending in a length direction. The body is adapted to be slideably rested on two guide rails abutting end-to-end. Each guide rail includes a tool base guiding track having first and second lateral walls. The first lateral surface of the body is adapted to extend across abutting ends of the guide rails. The second lateral wall of each guide rail is located between the first lateral wall of each guide rail and the first lateral surface of the body in a width direction perpendicular to the length direction. Two clamping pads are mounted on the body and spaced from each other in the length direction. The clamping pads are adapted to be located on opposite sides of the abutting ends of the guide rails. Each clamping pad is moveable between a clamping position and a non-clamping position, with the clamping position having a spacing to the first lateral surface in the width direction smaller than the non-clamping position.

In either of the first and second aspects, each clamping pad presses against the first lateral wall of one of the guide rails to abut the second lateral wall of each guide rail against the first lateral surface of the body when the clamping pads are in the clamping position. Thus, the first lateral walls of the guide rails are aligned with each other, and the second lateral walls of the guide rails are aligned with each other.

In a form shown, a longitudinal groove extends from a bottom face towards but spaced from the top face of the body and includes the first lateral surface and a second lateral surface parallel to the first lateral surface and spaced from the first lateral surface in the width direction. The top and bottom faces of the body are spaced from each other in a height direction perpendicular to the length and width directions and extend perpendicularly to the first and second lateral surfaces. The tool base guiding tracks of the guide rails are slideably received in a space between the first and second lateral walls. The body is slideable relative to the tool base guiding tracks in the length direction when the clamping pads are in the non-clamping position.

In the form shown, a first side of each clamping pad is located between a second side of each clamping pad and the tool base guiding tracks of the guide rails in the width direction. Two recesses are defined in the bottom face of the body and spaced from each other in the length direction. Each recess has an opening in communication with the longitudinal groove and a bottom wall spaced from the top face of the body in the height direction. A through-hole extends from the bottom wall of each recess through the top face of the body.

In the form shown, the alignment device further includes two knobs rotatably mounted on the top face of the body. Each knob includes a disc having upper and lower faces spaced from each other in a longitudinal axis of the disc. A stub is formed on the lower face of each knob and has a longitudinal axis coaxial to the longitudinal axis of the disc. The stub of each knob is rotatably received in one of the through-holes of the body. A handle is formed on the upper face of the disc of each knob. An eccentric through-hole extends from a top of the handle through a bottom of the stub of each knob and has a longitudinal axis radially offset from the longitudinal axis of the stub. A bolt is received in the eccentric through-hole of each knob and holds the knob and one of the clamping pads together. A spring mounted around each bolt biases the corresponding knob and the corresponding clamping pad toward each other. Rotation of the knobs causes movement of the clamping pads in the width direction between the clamping position and the non-clamping position. The first sides of the clamping pads are spaced from the tool base guiding tracks of the guide rails in the width direction when the first clamping pads are in the non-clamping position, and the body is slideable relative to the tool base guiding tracks of the guide rails in the length direction. The first sides of the clamping pads press against the first lateral walls of the guide rails to abut the second lateral walls of the guide rails against the first lateral surface of the longitudinal groove when the clamping pads are in the clamping position.

In the form shown, the body further includes first and second ends spaced from each other in the length direction, with the longitudinal groove extending from the first end through the second end of the body. The first lateral surface includes first, second, and third sections respectively at the first end, an intermediate portion between the first and second ends, and the second end of the body. The first lateral surface further includes a first recessed portion between the first and second sections and a second recessed portion between the second and third sections. The first and second recesses respectively face the recessed portions of the first lateral surface. The first and second recessed portions are adapted to receive dust in the longitudinal groove or on the tool base guiding tracks of the guide rails.

The first side of each clamping pad can be coated with a layer of plastic material to provide friction when engaged with the tool guiding tracks of the guide rails.

In a third aspect, a method for aligning guide rails for a woodworking tool includes abutting an end of a guide rail with an end of another guide rail. Each guide rail includes first and second lateral walls. An alignment device is placed on the abutting guide rails. The alignment device includes a body having a lateral surface extending in a length direction across the ends of the guide rails. The second lateral wall of each guide rail is located between the first lateral wall of each guide rail and the lateral surface of the body in a width direction perpendicular to the length direction. The alignment device further includes two clamping pads mounted on the body and spaced from each other in the length direction and on opposite sides of the abutting ends of the guide rails. The clamping pads of the placed alignment device are moved in the width direction to respectively press against the first lateral walls of the guide rails to abut the second lateral walls of the guide rails against the lateral surface of the body. Thus, the first lateral walls of the guide rails are aligned with each other, and the second lateral walls of the guide rails are aligned with each other. The aligned guide rails are fixed together. The clamping pads are moved away from the guide rails fixed together, with the guide rails fixed together remaining aligned with each other. The alignment device is then removed from the guide rails after the clamping pads are moved away.

Illustrative embodiments will become clearer in light of the following detailed description described in connection with the drawings.

DESCRIPTION OF THE DRAWINGS

The illustrative embodiments may best be described by reference to the accompanying drawings where.

Figure 1:
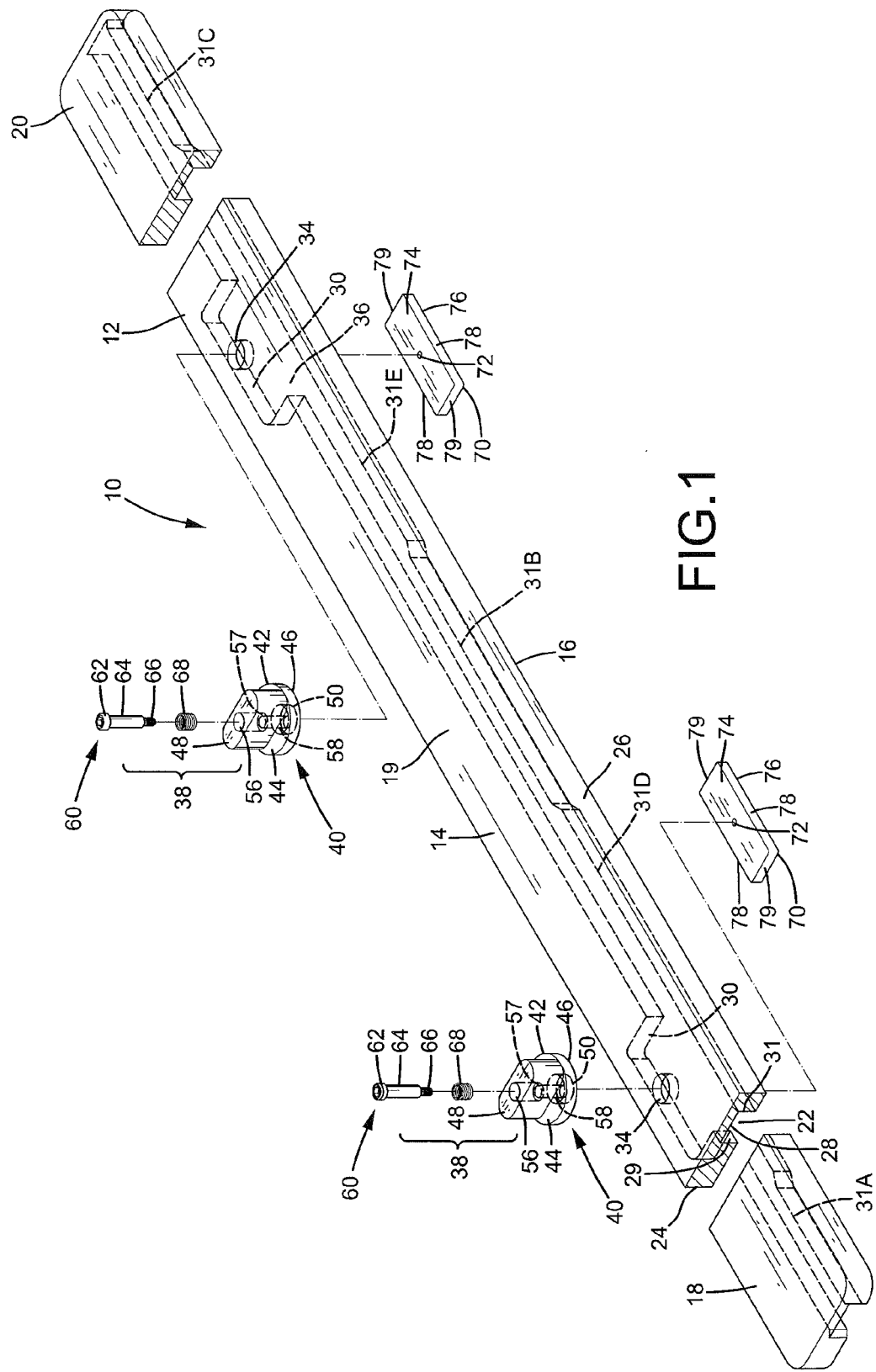
FIG. 1 shows an exploded, perspective view of an alignment device for guide rails, with portions of the alignment device cut away to show detailed structure.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "lower", "upper", "top", "bottom", "end", "portion", "section", "spacing", "longitudinal", "radially", "upward", "length", "width", "height", and similar terms are used herein, it should be understood that these terms have reference only to the structure shown in the drawings as it would appear to a person viewing the drawings and are utilized only to facilitate describing the illustrative embodiments.

DETAILED DESCRIPTION

An alignment device for guide rails for a woodworking tool 130 is shown in the drawings and generally designated 10. Woodworking tool 130 includes a base 132 with provisions for engaging with a guide rail 100A, 100B for the purposes of increasing accuracy and ease of use. Two or more guide rails 100A, 100B are required when the workpiece is longer than the length of a single guide rail 100A, 100B. Alignment device 10 is used to insure that two guide rails 100A, 100B are connected in a straight line. Although woodworking tool 130 is a circular saw in the form shown, other woodworking tools, such as routers, jigsaws, and the like, can be used with guide rails 100A, 100B.

According to the form shown, alignment device 10 includes a body 12 including a top face 14 and a bottom face 16 spaced from top face 14 in a height direction. Body 12 further includes a first end 18 and a second end 20 spaced from first end 18 in a length direction perpendicular to the height direction. Body 12 further includes a first side 24 and a second side 26 spaced from first side 24 in a width direction perpendicular to the length and height directions. A longitudinal groove 22 extends from first end 18 through second end 20 and extends from bottom face 16 towards but spaced from top face 14. Longitudinal groove 22 includes substantially U-shaped cross sections. Specifically, longitudinal groove 22 includes parallel, first and second lateral surfaces 31 and 29 spaced in the width direction and defining a space 27 therebetween. Longitudinal groove 22 further includes a bottom surface 28 extending perpendicularly to and between first and second lateral surfaces 31 and 29. First lateral surface 31 includes first section 31A at first end 18, a second section 31B at an intermediate portion 19 of body 12 between first and second ends 18 and 20, and a third section 31C at second end 20. First, second, and third sections 31A, 31B, and 31C are spaced from and aligned with each other in the length direction. A first recessed portion 31D is defined between first and second sections 31A and 31B. A second recessed portion 31E is defined between second and third sections 31B and 31C. Each of first and second recessed portions 31D and 31E has a spacing to second lateral surface 29 in the width direction larger than each of first, second, and third sections 31A, 31B, and 31C. Bottom surface 28 is located between top and bottom faces 14 and 16 in the height direction. Two recesses 30 are defined in bottom face 16 and spaced from each other in the length direction. Recesses 30 face first and second recessed portions 31D and 31E, respectively. Each recess 30 has an opening 36 in communication with longitudinal groove 22 and a bottom wall 32 spaced from top face 14 in the height direction. Bottom wall 32 of each recess 30 is at the same level as bottom surface 28 in the form shown. A through-hole 34 extends from bottom wall 32 of each recess 30 through top face 14 of body 12.

In the form shown, alignment device 10 further includes two sets of knob assemblies 38 each including a knob 40, a bolt 60, a spring 68, and a clamping pad 70. Knob 40 includes a disc 42 having circular cross sections perpendicular to a longitudinal axis L42 of disc 42. Disc 42 includes upper and lower faces 44 and 46 spaced from each other along longitudinal axis L42 of the disc 42. A stub 50 is formed on lower face 46 of disc 42. Stub 50 is substantially cylindrical and includes a bottom 52 having a spacing to upper face 44 larger than to lower face 46. Stub 50 has a longitudinal axis L50 coaxial to longitudinal axis L42 of disc 42. Stub 50 is rotatably received in one of through-holes 34 of body 12. A handle 48 is formed on upper face 44 and has a shape suitable for manual operation. An eccentric through-hole 54 extends from a top 55 of handle 48 through bottom 52 of stub 50. Eccentric through-hole 54 includes a larger section 56 having an upper end in top 55 of handle 48 and a smaller section 58 having an upper end connected to a lower end of larger section 56 and a lower end in bottom 52 of stub 50, forming a shoulder 57 between larger and smaller sections 56 and 58. Eccentric through-hole 54 has a longitudinal axis L54 radially offset from longitudinal axis L50 of stub 50 coaxial to longitudinal axis L42 of disc 42. Bolt 60 includes a shank 64, a head 62 on an end of shank 64, and a threaded section 66 on the other end of shank 64. Bolt 60 is received in eccentric through-hole 54, with head 62 received in larger section 56, with threaded section 66 located outside of eccentric through-hole 54, and with spring 68 located between head 62 and shoulder 57. Bolt 60 is a shoulder bolt in the form shown. However, bolt 60 of other types and shapes can be used.

In the form shown, each clamping pad 70 is a parallelepiped made of metal in the form shown and includes a top 74 and a bottom 76 opposite to top 74. Each clamping pad 70 further includes first and second sides 78 extending perpendicularly to and between top and bottom 74 and 76. Each clamping pad 70 further includes two ends 79 extending perpendicularly to and between top and bottom 74 and 76 and extending perpendicularly to and between first and second sides 78. A length between ends 79 of each clamping pad 70 is smaller than a length of each recess 30 of body 12 in the length direction. A width between first and second sides 78 of each clamping pad 70 is smaller than a width of each recess 30 of body 12 in the width direction. A screw hole 72 extends from top 74 through bottom 76. Screw hole 72 has an equal spacing to first and second sides 78 and has an equal spacing to ends 79. Each clamping pad 70 is received in one of recesses 30, with threaded section 66 of bolt 60 engaged with screw hole 72. Thus, each bolt 60 holds a corresponding clamping pad 70 and a corresponding knob 40 together, and each spring 68 biases the corresponding knob 40 and the corresponding clamping pad 70 toward each other. This keeps each knob 40 and the corresponding clamping pad 70 tight and still allows rotation of knob 40 and movement of clamping pad 70 in a plane generally perpendicular to longitudinal axis L50 of stub 50.

In use, first and second guide rails 100A and 100B are placed with an end of first guide rail 100A abutting an end of second guide rail 100B. Specifically, in the form shown, each of first and second guide rails 100A and 100B includes a top 101 and a bottom 103 opposite to top 101. A tool base guiding track 102 protrudes upward from top 101, forming a first engagement groove 104 in bottom 103. A height of tool base guiding track 102 from top 101 is smaller than a depth of longitudinal groove 22 in the height direction. Tool base guiding track 102 includes first and second lateral walls 108A and 108B and a top wall 108C extending between first and second lateral walls 108A and 108B. First and second lateral walls 108A and 108B are straight and parallel to each other. A second engagement groove 106 is defined by two inverted L-shaped walls on top 101 and is parallel to and spaced from first engagement groove 104. Each of first and second engagement grooves 104 and 106 and tool base guiding track 102 extends throughout an overall length of first and second guide rails 100A and 100B. A first connector 110A has a section engaged in first engagement groove 104 of first guide rail 100A. The remaining section of first connector 110A is engaged in first engagement groove 104 of second guide rail 100B. Likewise, a second connector 110B has a section engaged in second engagement groove 106 of first guide rail 100A. The remaining section of second connector 110B is engaged in second engagement groove 106 of second guide rail 100B. Thus, first and second guide rails 100A and 100B are connected end-to-end. Each of first and second connectors 110A and 110B includes a plurality of through-holes 112 each extending from top 101 through bottom 103.

Figure 2:
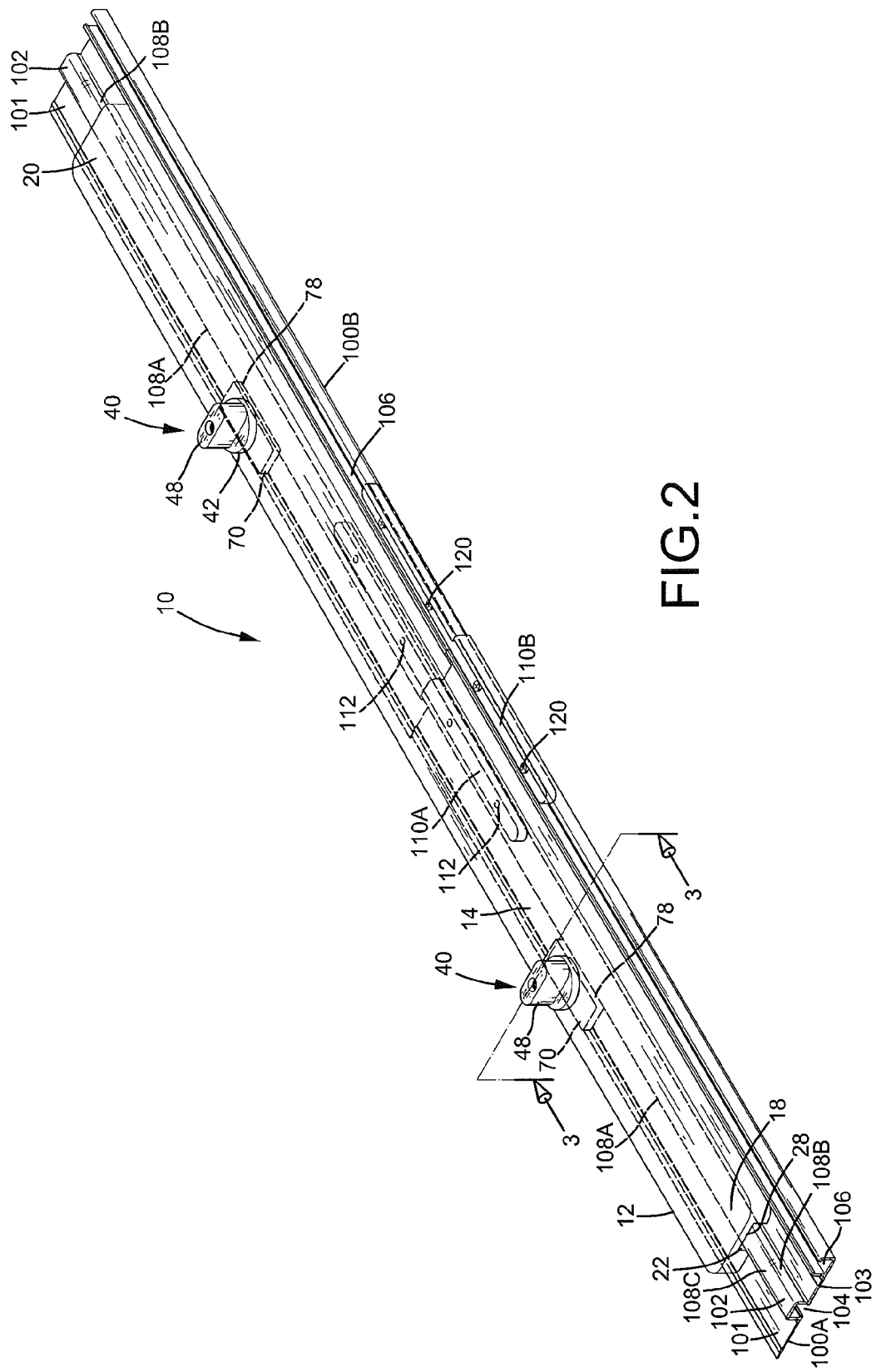
FIG. 2 shows a perspective view of the alignment device of FIG. 1 and two guide rails on which the alignment device is mounted.
Figure 3:
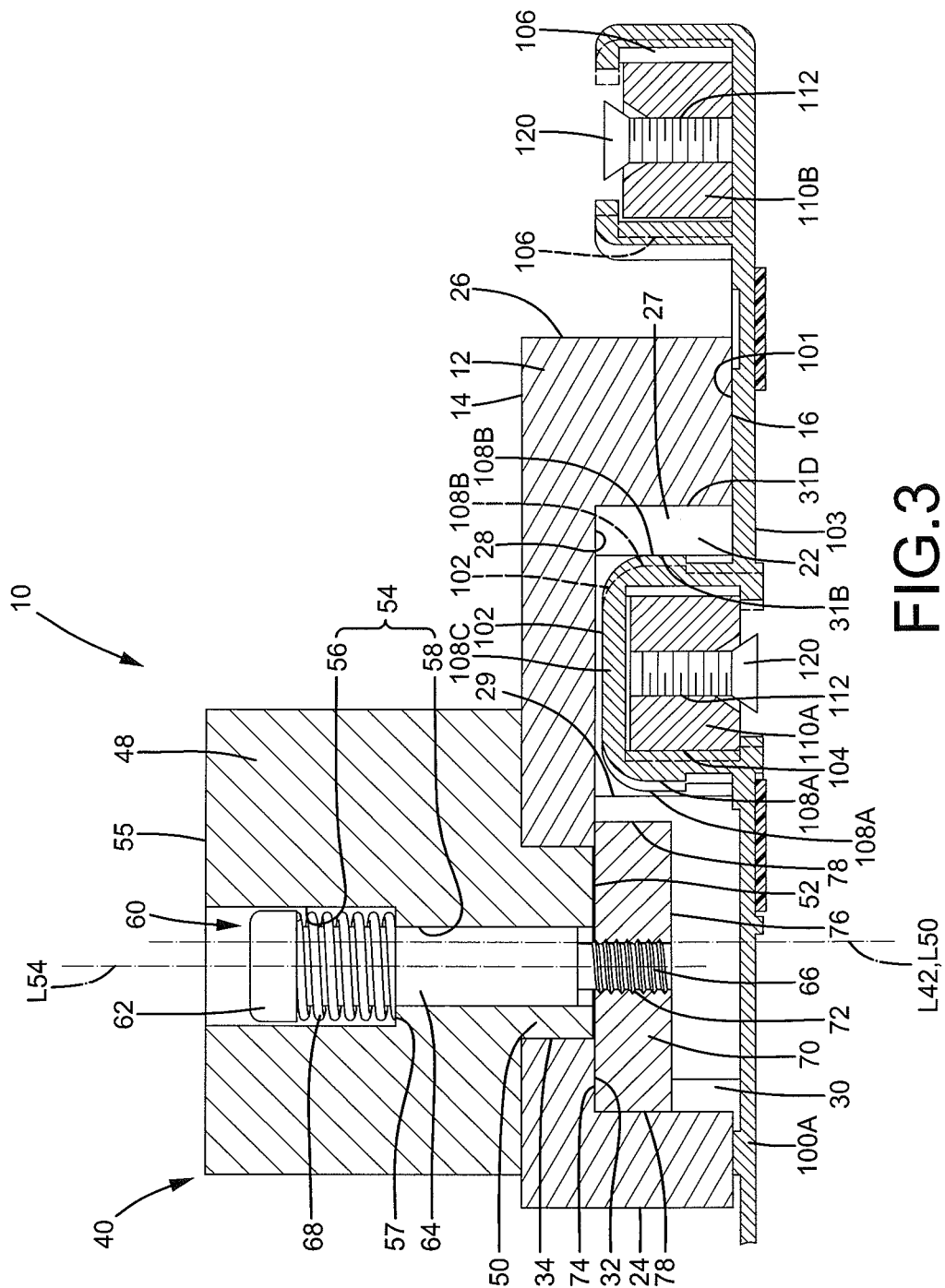
FIG. 3 shows a cross sectional view of the alignment device and the guide rails of FIG. 2 according to section line 3-3 of FIG. 2, with the guide rails not in a straight line.

Alignment device 10 is placed on first and second guide rails 100A and 100B, with space 27 in longitudinal groove 22 receiving portions of tool base guiding tracks 102 of first and second guide rails 100A and 100B, with body 12 approximately centered between first and second guide rails 100A and 100B, with first side 78 of each clamping pad 70 located between second side 78 and first lateral wall 108A of a corresponding guide rail 100A, 100B, and with bottom surface 28 of longitudinal groove 22 of body 12 spaced from top walls 108C of tool base guiding tracks 102 of first and second guide rails 100A and 100B in the height direction. Second lateral wall 108B of each of first and second guide rails 100A and 100B is located between first lateral wall 108A of each of first and second guide rails 100A and 108B and first lateral surface 31 of body 12. When knobs 40 are in a non-clamping position shown in FIGS. 2 and 3, first side 78 of each clamping pad 70 is spaced from first lateral wall 108A of tool base guiding track 102 of a corresponding guide rail 100A, 100B. Thus, body 12 of alignment device 10 can be moved freely relative to first and second guide rails 100A and 100B. Note that first and second guide rails 100A and 100B may not be in a straight line such that first and second lateral walls 108A and 108B of first guide rail 100A are not aligned with first and second lateral walls 108A and 108B of second guide rail 100B, respectively (see phantom lines indicating second lateral wall 108B, tool base guiding track 102, and second engagement groove 106 of second guide rail 100B in FIG. 3).

Figure 4:
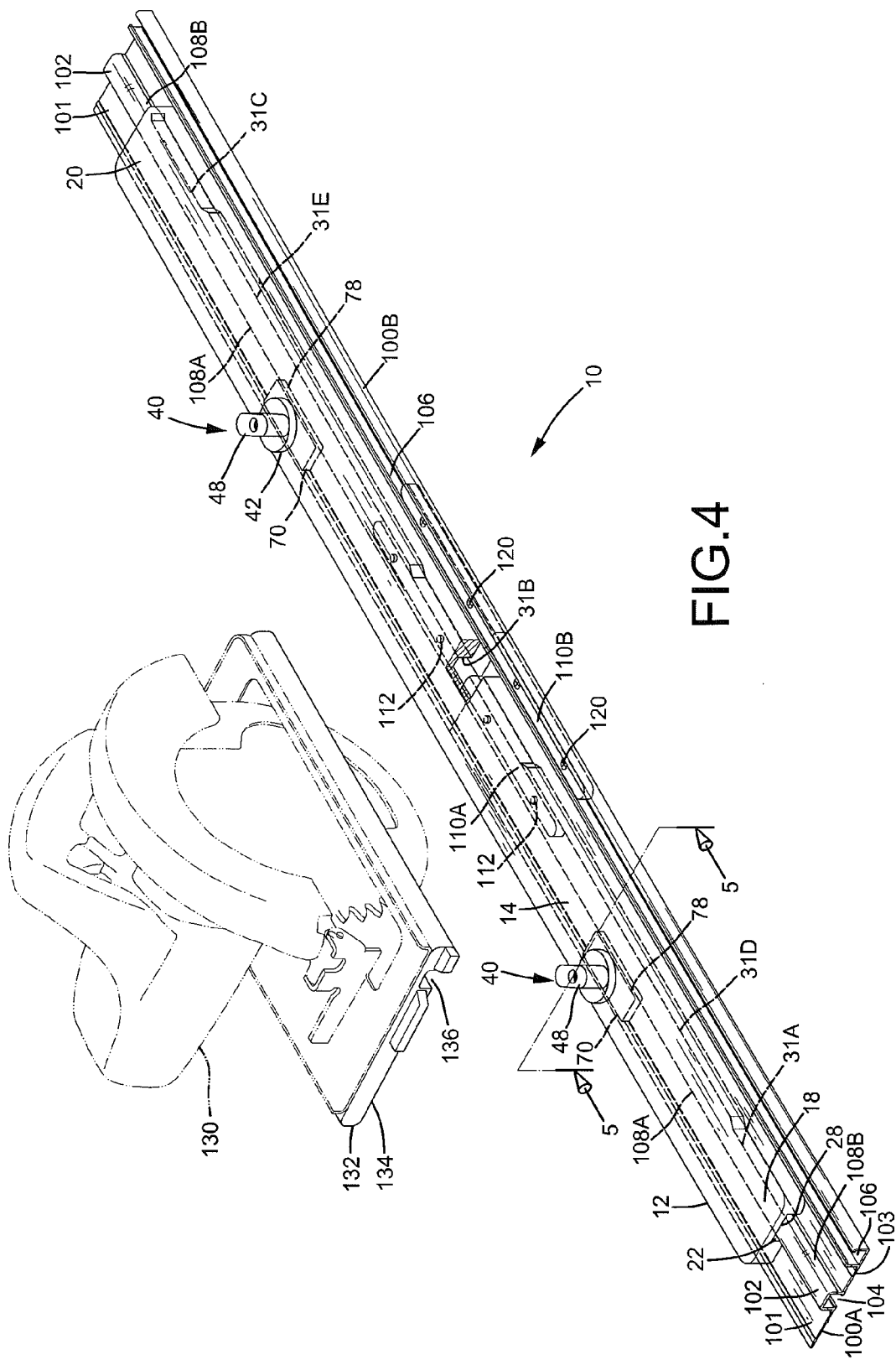
FIG. 4 shows a perspective view similar to FIG. 2, with two knobs rotated to a clamping position to align the guide rails, and with a woodworking tool adapted to be engaged with the guide rails after the alignment device is removed.
Figure 5:
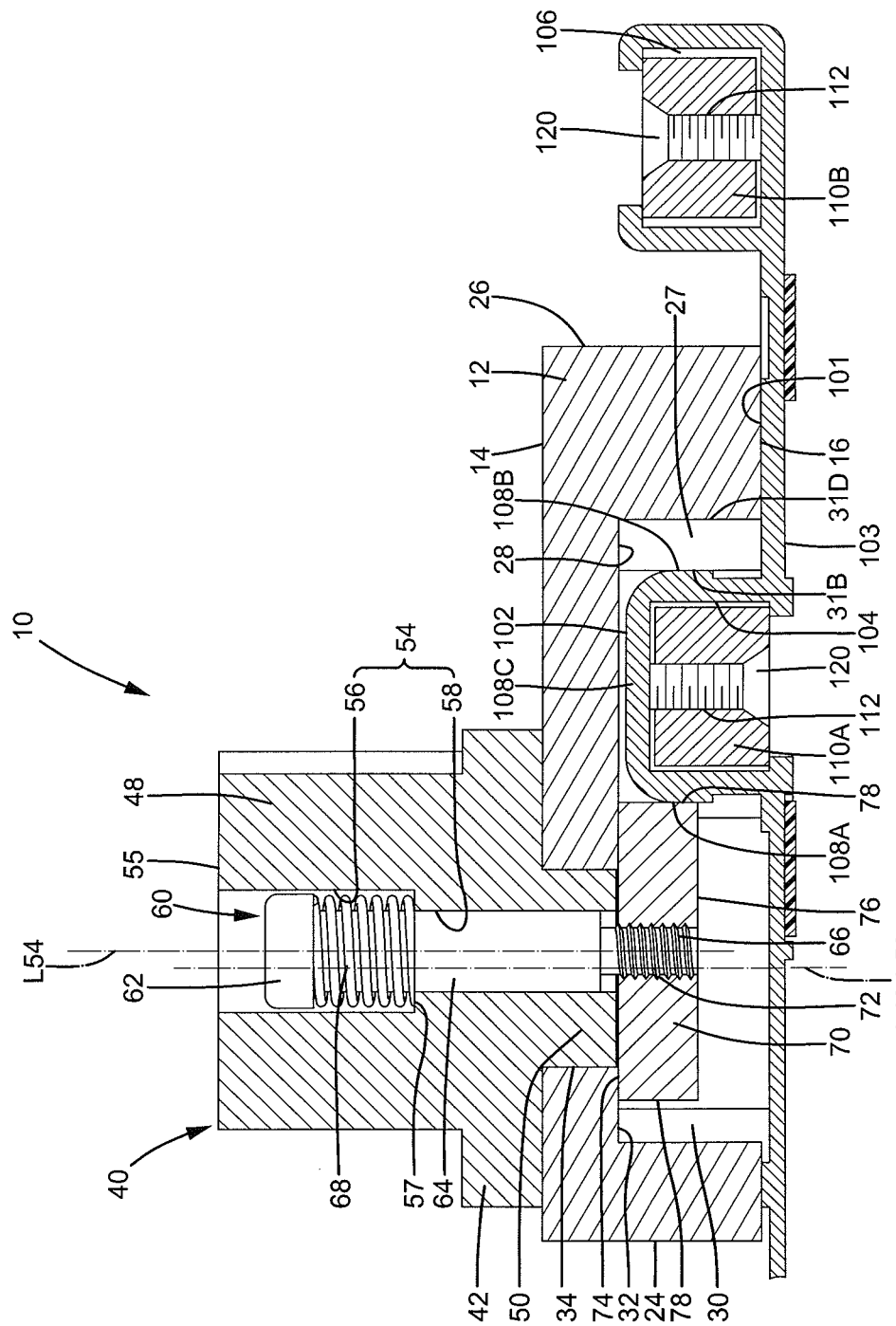
FIG. 5 shows a cross sectional view of the alignment device and the guide rails of FIG. 4 according to section line 5-5 of FIG. 4.

Knobs 40 can be rotated through an angle to a clamping position (FIGS. 4 and 5) to align first and second lateral walls 108A and 108B of first guide rail 100A with first and second lateral walls 108A and 108B of second guide rail 100B so that first and second guide rails 100A and 100B are in a straight line. Specifically, since longitudinal axis L54 of eccentric through-hole 54 of each knob 40 is offset from longitudinal axis L50 of stub 50 (and also offset from longitudinal axis L42 of disc 42), a longitudinal axis of each bolt 60 rotates in a circular path around longitudinal axis L50 of stub 50 while the whole knob assembly 38 rotates about longitudinal axis L42 of disc 42 coaxial to longitudinal axis L50 of stub 50.

Clamping pad 70 secured to each bolt 60 is moved in a plane perpendicular to longitudinal axis L42 of disc 42. Movement of clamping pad 70 includes displacement of clamping pad 70 in the width and length directions. Displacement of clamping pad 70 in the width direction causes first side 78 of clamping pad 70 to press against first lateral wall 108A of tool base guiding track 102 of a corresponding guide rail 100A, 100B and to move guide rail 100A, 100B to a position in which second lateral wall 108B of guide rail 100A, 100B abuts against first lateral surface 31 of longitudinal groove 22. Namely, second lateral walls 108B of both of first and second guide rails 100A and 100B facing away from clamping pad 70 abut against first lateral surface 31 of longitudinal groove 22 of body 12 and are, thus, aligned with each other.

Specifically, rotation of knob 40 adjacent to first end 18 of body 12 causes movement of a corresponding clamping pad 70 to abut first guide rail 100A against first and second sections 31A and 31B of first lateral surface 31 of longitudinal groove 22. Likewise, rotation of knob 40 adjacent to second end 20 of body 12 causes movement of a corresponding clamping pad 70 to abut second guide rail 100B against second and third sections 31B and 31C of first lateral surface 31 of longitudinal groove 22. Thus, first lateral wall 108A of first guide rail 100A is aligned with first lateral wall 108A of second guide rail 100B. Note that tool base guiding track 102 of each of first and second guide rails 100A and 100B is securely clamped between one of clamping pads 70 and first lateral surface 31 of longitudinal groove 22 of body 12 to assure alignment of first lateral walls 108A of first and second guide rails 100A and 100B. Screws 120 received in through-holes 112 of first and second connectors 110A and 110B are tightened to securely fix first and second connectors 110A and 110B in first and second engagement grooves 104 and 106 of first and second guide rails 100A and 100B while alignment device 10 keeps first and second guide rails 100A and 100B in a straight line.

After fixing first and second connectors 110A and 110B in place to maintain first and second guide rails 100A and 100B in a straight line, knobs 40 are rotated back to the non-clamping position. The longitudinal axis of each bolt 60 rotates in the circular path around longitudinal axis L50 of stub 50 in a reverse direction while the whole knob assembly 38 rotates about longitudinal axis L42 of disc 42 coaxial to longitudinal axis L50 of stub 50. Each clamping pad 70 is moved in the plane perpendicular to longitudinal axis L50 of stub 50 in a reverse direction to disengage first side 78 of clamping pad 70 from first lateral wall 108A of tool base guiding track 102 of the corresponding guide rail 100A, 100B, allowing free movement of body 12 along tool base guiding tracks 102. Body 12 is then removed from first and second guide rails 100A and 100B. After placing first and second guide rails 100A and 100B on a workpiece longer than a single guide rail 100A, 100B, woodworking tool 130 can be placed on first and second guide rails 100A and 100B. Base 132 of woodworking tool 130 includes a bottom 134 having a channel 136 slideably receiving tool base guiding tracks 102 of first and second guide rails 100A and 100B such that woodworking tool 130 can slide along tool base guiding tracks 102 of first and second guide rails 100A and 100B to perform its woodworking function on the workpiece longer than a single guide rail 100A, 100B. It can be appreciated that more than two guide rails 100A, 100B can be connected in a straight line by using the same or another alignment device 10.

First and second recessed portions 31D and 31E can receive dust, debris, and the like in longitudinal groove 22 of alignment device 10 or on tool base guiding tracks 102 of first and second guide rails 100A and 100B, further insuring the alignment function.

Thus, first and second guide rails 100A and 100B, alignment device 10, and connectors (including first and second connectors 110A and 110B and screws 120 in the form shown) together form a useful woodworking utensil to reliably align first and second guide rails 100A and 100B in a straight line and fixed by the connectors. After removal of alignment device 10, woodworking tool 130 can be used with first and second guide rails 100A and 100B for cutting a workpiece longer than a single guide rail 100A, 100B. The operation for aligning first and second guide rails 100A and 100B and for removing alignment device 10 after alignment can be easily accomplished even by an ordinary user. It can be appreciated that other forms of first and second guide rails and/or connectors fixing aligned first and second guide rails together can be used.

First side 78 of each clamping pad 70 abutting first lateral wall 108A of tool base guiding track 102 is coated with a layer of plastic material, so that damage to tool base guiding tracks 102 of first and second guide rails 100A and 100B is avoided. Furthermore, the layer of plastic material on first sides 78 of clamping pads 70 provide friction when engaged with tool base guiding tracks 102 of first and second guide rails 100A and 100B.

Now that the basic teachings have been explained, many extensions and variations will be obvious to one having ordinary skill in the art. For example, longitudinal groove 22 can extend from first side 24 towards but spaced from second side 26 without having second lateral surface 29. Furthermore, clamping pads 70 can be actuated by provisions other than knob assemblies 38. As an example, clamping pads 70 can be moved by a single bar having a portion connected to clamping pads 70 and manually movable to move clamping pads 70 between the clamping and non-clamping position. Further, first lateral surface 31 does not have to include first and second recessed portions 31D and 31E to allow easy formation of longitudinal groove 22 while achieving the alignment function. Further, body can include only one recess 30 to accommodate clamping pads 70.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A woodworking utensil comprising:
  first and second guide rails each including a tool base guiding track having first and second lateral walls, with each of the first and second guide rails having an end, with the end of the first guide rail adapted to abut the end of the second guide rail, with the tool base guiding tracks of the first and second guide rails adapted to be slideably received in a channel of a base of a woodworking tool;
  an alignment device for aligning the first and second guide rails abutting end-to-end in a straight line, with the alignment device including:
    a body including a first lateral surface extending in a length direction, with the body slideably rested on the first and second guide rails abutting end-to-end, with the first lateral surface extending across the abutting ends of the first and second guide rails, with the second lateral wall of each of the first and second guide rails located between the first lateral wall of each of the first and second guide rails and the first lateral surface of the body in a width direction perpendicular to the length direction; and first and second clamping pads mounted on the body and spaced from each other in the length direction and on opposite sides of the abutting ends of the first and second guide rails, with each of the first and second clamping pads moveable between a clamping position and a non-clamping position, with the clamping position having a spacing to the first lateral surface in the width direction smaller than the non-clamping position; and at least one connector fixing the first and second guide rails in the straight line together, wherein the first clamping pad presses against the first lateral wall of the first guide rail to abut the second lateral wall of the first guide rail against the first lateral surface of the body with the first clamping pad in the clamping position, wherein the second clamping pad presses against the first lateral wall of the second guide rail to abut the second lateral wall of the second guide rail against the first lateral surface of the body with the second clamping pad in the clamping position, aligning the first lateral wall of the first guide rail with the first lateral wall of the second guide rail, and aligning the second lateral wall of the first guide rail with the second lateral wall of the second guide rail; and with the body further including a second lateral surface parallel to the first lateral surface and spaced from the first lateral surface in the width direction, with the first and second lateral surfaces defining a space therebetween, with each of the first and second clamping pads moveably received in the space, with the tool base guiding tracks of the first and second guide rails slideably received in the space, with the body slideable relative to the tool base guiding tracks of the first and second guide rails in the length direction with the first and second clamping pads in the non-clamping position.

2. The woodworking utensil as claimed in claim 1, with the body further including a bottom face extending perpendicularly to the first and second lateral surfaces, with the bottom face of the body slideably resting on the tool base guiding tracks of the first and second guide rails.

3. The woodworking utensil as claimed in claim 2, with the body further including a top face spaced from the bottom face in a height direction perpendicular to the length and width directions, with the body further including a longitudinal groove extending from the bottom face towards but spaced from the top face of the body, with the longitudinal groove including the first and second lateral surfaces, with the longitudinal groove further including a bottom surface extending between the first and second lateral surfaces and located between the top and bottom faces of the body in the height direction, with the first and second lateral surfaces being continuous in the length direction.

4. The woodworking utensil as claimed in claim 3, with the alignment device further including:

first and second knobs rotatably mounted on the top face of the body, with each of the first and second clamping pads including first and second sides spaced from each other in the width direction, with the first side of each of the first and second clamping pads located between the second side of each of the first and second clamping pads and the tool base guiding tracks of the first and second guide rails in the width direction; and first and second recesses defined in the bottom face of the body and spaced from each other in the length direction, with each of the first and second recesses having an opening in communication with the longitudinal groove and a bottom wall spaced from the top face of the body in the height direction, with a through-hole extending from the bottom wall of each of the first and second recesses through the top face of the body, with the first and second knobs respectively and operatively coupled to the first and second clamping pads through the through-holes, with rotation of the first and second knobs causing movement of the first and second clamping pads in the width direction between the clamping position and the non-clamping position, wherein the first sides of the first and second clamping pads are spaced from the tool base guiding tracks of the first and second guide rails in the width direction with the first and second clamping pads in the non-clamping position, wherein the body is slideable relative to the tool base guiding tracks of the first and second guide rails in the length direction, and wherein the first sides of the first and second clamping pads press against the first lateral walls of the first and second guide rails to abut the second lateral walls of the first and second guide rails against the first lateral surface of the longitudinal groove with the first and second clamping pads in the clamping position.

5. The woodworking utensil as claimed in claim 4, with the alignment device further including first and second bolts, with each of the first and second knobs including a disc having upper and lower faces spaced from each other in a longitudinal axis of the disc, with a stub formed on the lower face of each of the first and second knobs and having a longitudinal axis coaxial to the longitudinal axis of the disc, with the stub of each of the first and second knobs rotatably received in one of the through-holes of the body, with the stub of each of the first and second knobs including a bottom having a spacing to the upper face larger than to the lower face of the disc, with a handle formed on the upper face of the disc of each of the first and second knobs and having a top, with an eccentric through-hole extending from the top of the handle through the bottom of the stub of each of the first and second knobs and having a longitudinal axis radially offset from the longitudinal axis of the stub, with the first bolt received in the eccentric through-hole of the first knob and fixed to the first clamping pad, with the second bolt received in the eccentric through-hole of the second knob and fixed to the second clamping pad.

6. The woodworking utensil as claimed in claim 5, with the alignment device further including first and second springs, with each of the first and second clamping pads including a screw hole, with each of the first and second bolts including a shank, a head on an end of the shank and a threaded section on another end of the shank, with the eccentric through-hole of each of the first and second knobs including a larger section and a smaller section located below the larger section in the height direction, forming a shoulder between the larger section and the smaller section, with the head of the first bolt received in the larger section of the eccentric through-hole of the first knob, with the threaded section of the first bolt engaged with the screw hole of the first clamping pad, with the first spring mounted around the first bolt and located between the head and the shoulder of the first bolt, with the first bolt holding the first clamping pad and the first knob together, with the first spring biasing the first knob and the first clamping pad toward each other, and with the head of the second bolt received in the larger section of the eccentric through-hole of the second knob, with the threaded section of the second bolt engaged with the screw hole of the second clamping pad, with the second spring mounted around the second bolt and located between the head and the shoulder of the second bolt, with the second bolt holding the second clamping pad and the second knob together, with the second spring biasing the second knob and the second clamping pad toward each other.

7. The woodworking utensil as claimed in claim 6, with the first side of each of the first and second clamping pads coated with a layer of plastic material, with the layer of plastic material on the first side of each of the first and second clamping pads providing friction when engaged with the tool guiding tracks of the first and second guide rails.

8. The woodworking utensil as claimed in claim 6, with the body further including first and second ends spaced from each other in the length direction, with the longitudinal groove extending from the first end through the second end of the body, with the body further including an intermediate portion between the first and second ends, with the first lateral surface including a first section at the first end of the body, a second section at the intermediate portion of the body, and a third section at the second end of the body, with the first, second, and third sections aligned with each other in the length direction, with the first lateral surface further including a first recessed portion between the first and second sections and a second recessed portion between the second and third sections, with the first recess facing the first recessed portion of the first lateral surface, with the second recess facing the second recessed portion of the first lateral surface, with the first and second recessed portions adapted to receive dust in the longitudinal groove or on the tool base guiding tracks of the first and second guide rails.

9. An alignment device for woodworking tool guide rails, comprising, in combination:
    a body including a first lateral surface extending in a length direction, with the body adapted to be slideably rested on first and second guide rails abutting end-to-end, with each of the first and second guide rails including a tool base guiding track having first and second lateral walls, with the first lateral surface of the body adapted to extend across abutting ends of the first and second guide rails, with the second lateral wall of each of the first and second guide rails located between the first lateral wall of each of the first and second guide rails and the first lateral surface of the body in a width direction perpendicular to the length direction; and
    first and second clamping pads mounted on the body and spaced from each other in the length direction, with the first and second clamping pads adapted to be located on opposite sides of the abutting ends of the first and second guide rails, with each of the first and second clamping pads moveable between a clamping position and a non-clamping position, with the clamping position having a spacing to the first lateral surface in the width direction smaller than the non-clamping position,
    wherein the first clamping pad is adapted to press against the first lateral wall of the first guide rail to abut the second lateral wall of the first guide rail against the first lateral surface of the body with the first clamping pad in the clamping position, wherein the second clamping pad is adapted to press against the first lateral wall of the second guide rail to abut the second lateral wall of the second guide rail against the first lateral surface of the body with the second clamping pad in the clamping position, aligning the first lateral wall of the first guide rail with the first lateral wall of the second guide rail, and aligning the second lateral wall of the first guide rail with the second lateral wall of the second guide rail; and with the body further including a second lateral surface parallel to the first lateral surface and spaced from the first lateral surface in the width direction, with the first and second lateral surfaces defining a space therebetween, with each of the first and second clamping pads moveably received in the space, with the tool base guiding tracks of the first and second guide rails slideably received in the space, with the body slideable relative to the tool base guiding tracks of the first and second guide rails in the length direction with the first and second clamping pads in the non-clamping position.

10. The alignment device for woodworking tool guide rails as claimed in claim 9, with the body further including a bottom face extending perpendicularly to the first and second lateral surfaces, with the bottom face of the body adapted to slideably rest on the tool base guiding tracks of the first and second guide rails.

11. The alignment device for woodworking tool guide rails as claimed in claim 10, with the body further including a top face spaced from the bottom face in a height direction perpendicular to the length and width directions, with the body further including a longitudinal groove extending from the bottom face towards but spaced from the top face of the body, with the longitudinal groove including the first and second lateral surfaces, with the longitudinal groove further including a bottom surface extending between the first and second lateral surfaces and located between the top and bottom faces of the body in the height direction, with the first and second lateral surfaces being continuous in the length direction.

12. The alignment device for woodworking tool guide rails as claimed in claim 11, further comprising, in combination:
    first and second knobs rotatably mounted on the top face of the body, with each of the first and second clamping pads including first and second sides spaced from each other in the width direction, with the first side of each of the first and second clamping pads adapted to be located between the second side of each of the first and second clamping pads and the tool base guiding tracks of the first and second guide rails in the width direction; and
    first and second recesses defined in the bottom face of the body and spaced from each other in the length direction, with each of the first and second recesses having an opening in communication with the longitudinal groove and a bottom wall spaced from the top face of the body in the height direction, with a through-hole extending from the bottom wall of each of the first and second recesses through the top face of the body,
    with the first and second knobs respectively and operatively coupled to the first and second clamping pads through the through-holes, with rotation of the first and second knobs causing movement of the first and second clamping pads in the width direction between the clamping position and the non-clamping position,
    wherein the first sides of the first and second clamping pads are adapted to be spaced from the tool base guiding tracks of the first and second guide rails in the width direction with the first and second clamping pads in the non-clamping position, with the body adapted to be slideable relative to the tool base guiding tracks of the first and second guide rails in the length direction, and
    wherein the first sides of the first and second clamping pads are adapted to press against the first lateral walls of the first and second guide rails to abut the second lateral walls of the first and second guide rails against the first lateral surface of the longitudinal groove with the first and second clamping pads in the clamping position.

13. The alignment device for woodworking tool guide rails as claimed in claim 12, further comprising, in combination:
first and second bolts,
with each of the first and second knobs including a disc having upper and lower faces spaced from each other in a longitudinal axis of the disc, with a stub formed on the lower face of each of the first and second knobs and having a longitudinal axis coaxial to the longitudinal axis of the disc, with the stub of each of the first and second knobs rotatably received in one of the through-holes of the body, with the stub of each of the first and second knobs including a bottom having a spacing to the upper face larger than to the lower face of the disc, with a handle formed on the upper face of the disc of each of the first and second knobs and having a top, with an eccentric through-hole extending from the top of the handle through the bottom of the stub of each of the first and second knobs and having a longitudinal axis radially offset from the longitudinal axis of the stub, with the first bolt received in the eccentric through-hole of the first knob and fixed to the first clamping pad, with the second bolt received in the eccentric through-hole of the second knob and fixed to the second clamping pad.

14. The alignment device for woodworking tool guide rails as claimed in claim 13, further comprising, in combination:
first and second springs,
with each of the first and second clamping pads including a screw hole, with each of the first and second bolts including a shank, a head on an end of the shank and a threaded section on another end of the shank, with the eccentric through-hole of each of the first and second knobs including a larger section and a smaller section located below the larger section in the height direction, forming a shoulder between the larger section and the smaller section,
with the head of the first bolt received in the larger section of the eccentric through-hole of the first knob, with the threaded section of the first bolt engaged with the screw hole of the first clamping pad, with the first spring mounted around the first bolt and located between the head and the shoulder of the first bolt, with the first bolt holding the first clamping pad and the first knob together, with the first spring biasing the first knob and the first clamping pad toward each other, and
with the head of the second bolt received in the larger section of the eccentric through-hole of the second knob, with the threaded section of the second bolt engaged with the screw hole of the second clamping pad, with the second spring mounted around the second bolt and located between the head and the shoulder of the second bolt, with the second bolt holding the second clamping pad and the second knob together, with the second spring biasing the second knob and the second clamping pad toward each other.

15. The alignment device for woodworking tool guide rails as claimed in claim 14, with the first side of each of the first and second clamping pads coated with a layer of plastic material, with the layer of plastic material on the first side of each of the first and second clamping pads adapted to provide friction when engaged with the tool guiding tracks of the first and second guide rails.

16. The alignment device for woodworking tool guide rails as claimed in claim 14, with the body further including first and second ends spaced from each other in the length direction, with the longitudinal groove extending from the first end through the second end of the body, with the body further including an intermediate portion between the first and second ends, with the first lateral surface including a first section at the first end of the body, a second section at the intermediate portion of the body, and a third section at the second end of the body, with the first, second, and third sections aligned with each other in the length direction, with the first lateral surface further including a first recessed portion between the first and second sections and a second recessed portion between the second and third sections, with the first recess facing the first recessed portion of the first lateral surface, with the second recess facing the second recessed portion of the first lateral surface, with the first and second recessed portions adapted to receive dust in the longitudinal groove or on the tool base guiding tracks of the first and second guide rails.

\* \* \* \* \*